United States Patent [19]

Schulte et al.

[11] 4,345,892

[45] Aug. 24, 1982

[54] INJECTION MOULDING DIE WITH HEAVY-DUTY SPRUE BUSH

[75] Inventors: Wolfgang Schulte, Schalksmühle-Heedfeld; Giacinto Castiglia, Lüdenscheid, both of Fed. Rep. of Germany

[73] Assignee: Firma Jetform Heisskanalnormalien und Zubehor GmbH, Fed. Rep. of Germany

[21] Appl. No.: 210,226

[22] Filed: Nov. 25, 1980

[30] Foreign Application Priority Data

Jan. 23, 1980 [DE] Fed. Rep. of Germany ....... 3002264

[51] Int. Cl.$^3$ .............................................. B29F 1/08
[52] U.S. Cl. ................................... 425/548; 425/549; 425/568; 425/572; 425/588; 264/328.9
[58] Field of Search ............... 425/549, 572, 548, 568, 425/588; 264/328.9

[56] References Cited

U.S. PATENT DOCUMENTS

| | | | |
|---|---|---|---|
| 3,677,682 | 7/1972 | Putkowski | 425/548 X |
| 4,184,836 | 1/1980 | Rees | 425/588 |
| 4,212,624 | 7/1980 | Ando et al. | 425/548 |

FOREIGN PATENT DOCUMENTS

| | | | |
|---|---|---|---|
| 13118 | 12/1979 | European Pat. Off. . | |
| 13119 | 6/1980 | European Pat. Off. | 425/549 |
| 514428 | 12/1971 | Fed. Rep. of Germany . | |
| 2745146 | 6/1978 | Fed. Rep. of Germany . | |
| 2852458 | 7/1979 | Fed. Rep. of Germany . | |
| 52-9063 | 1/1977 | Japan | 425/572 |
| 53-72063 | 6/1978 | Japan . | |

*Primary Examiner*—Thomas P. Pavelko
*Attorney, Agent, or Firm*—Bacon & Thomas

[57] ABSTRACT

Apparatus for injection moulding thermoplastic material is disclosed wherein a heavy-duty sprue bush is heated along a substantial portion of its length to keep the thermoplastic material from solidifying during interruptions in the moulding cycle. The apparatus provides for minimal contact between the heated sprue bush and the moulding die to prevent heat transfer between them. This is achieved by maintaining an air gap between the bush and the die except at points where the thermoplastic material passes into the moulding cavity. Sprue runners oriented generally parallel to the mould joint line are aligned with cavity injection openings which are similarly oriented. These injection openings pass through a thin wall of the mould that extends generally perpendicularly to the joint line such that when the moulds are open, the sprue is cleanly severed from the moulded article.

8 Claims, 3 Drawing Figures

INJECTION MOULDING DIE WITH HEAVY-DUTY SPRUE BUSH

BACKGROUND OF THE INVENTION

The invention relates to an injectin moulding die with a heavy-duty sprue bush for a lateral spruing through tunnel gating to each mould chamber, the heavy-duty sprue bush being aligned vertically to the jointing plane of the die.

SUMMARY OF THE INVENTION

It is the object of the invention to achieve a proper and clean sprue. Between moulding cycle intervals no interfering structures should be formed in the injection moulding material. Primarily there should not be any undue cooling and subsequent hardening of the sprue lines.

According to the invention this object is solved by the following features:
(a) on the front end of the sprue bush there is provided an orifice head with sprue runners, which extend in parallel to the jointing plane of the moulding die;
(b) the front end of the sprue bush as well as the orifice head are heated with a coiled high watt density heater;
(c) the ports of the sprue runners tightly abut against injection openings of the specific moulding chamber;
(d) the axes of the injection openings into the specific moulding chambers are oriented parallel to the jointing plane.

According to the invention the whole sprue bush is kept at a high temperature, at which the thermoplast material remains plastic. Consequently, the sprues do not harden in the moulding apparatus due to cooling. When separating the die halves, the sprue line is separated cleanly and without burr, because the plane of the injection opening is oriented perpendicularly to the jointing plane. This causes a clean shearing off of the sprue run when the die is opened.

In a further development of the invention the front end of the sprue bush and the orifice head have a cylindrical outer wall wound with coiled high watt density heaters, so as to leave a free air gap between them and a receiving chamber in the die. This achieves an efficient heating of the sprue bush while providing efficient heat insulation with respect to the cooled die.

In a further development of the invention the orifice head comprises recesses between its sprue runners on the periphery so that further air gaps are left free within the receiving chamber, thereby improving the heat insulation.

Furthermore, the invention proposes that a duct extends in the longitudinal direction to the front end of the spure bush for a sensitive element, particularly a temperature sensitive element. By this, the temperature immediately in the range of the orifice head can be measured and, thus, controlled or regulated. This contributes considerably to the improvement of the injection moulded products.

The invention also proposes that the receiving chamber fo the sprue bush reaches as near as possible to the moulding chamber so that the moulding chamber has a very thin partition wall between them (wall thickness approximately 0.7 to 1.5 mm) in the range of the injection opening. By this it is possible to keep the sprue line very short.

Finally, the invention proposes that a sleeve surround the coiled high watt density heater in the vicinity of the orifice head. This effects a heat concentration in the orifice head.

BRIEF DESCRIPTION OF THE DRAWINGS

Embodiments of the invention will be described in the following wth reference to the attached drawings, wherein.

DETAILED DESCRIPTION OF THE PREFERRED EMBODIMENT

Figure 1:
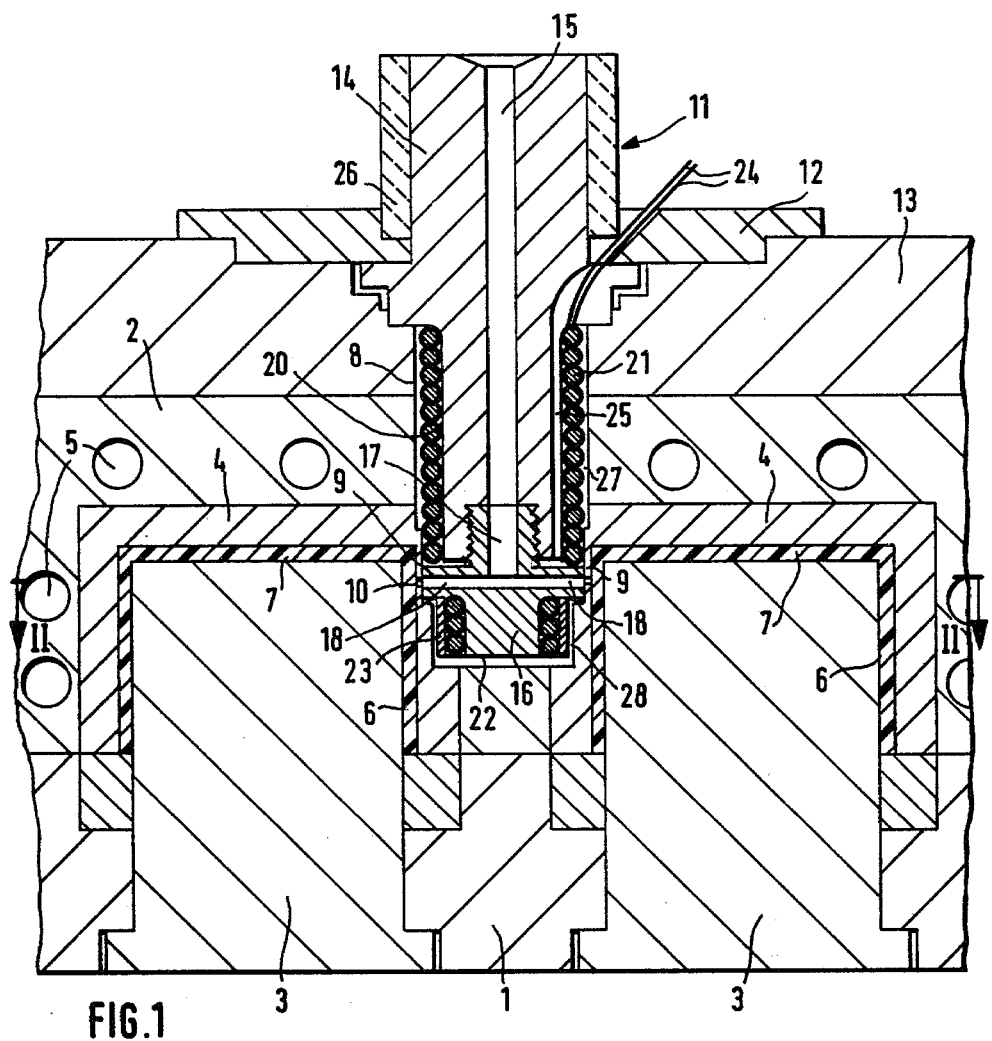
FIG. 1 is a section through an injection moulding die according to the invention.

An injection moulding die according to FIG. 1 comprises two mould platens 1 and 2, which each receive a mould core 3 or a mould insert 4. The details of the mounting of the mould cores, mould inserts, and mould platens are not shown in the Figures as they are believed bo be well-known in the art. Within the mould platen 2 there are also provided ducts 5 for a cooling medium. The mould insert 4 defines with the mould core 3 a moulding chamber 6 for a moulding 7. Within the mould platen 2 there is a receiving chamber 8 which has a cylindrical cross-section in the embodiment shown. This receiving chamber 8 extends also into the mould inserts 4 so that in the range of the moulding chambers 6 there remains merely a very small partition wall 9 having a wall thickness of approximately 0.7 to 1.5 mm. Within this partition wall 9 there is provided in each case an injection gate 10 having a cross-section of approximately 1 to 2 mm. This injection gate 10 is aligned with its axis perpendicular to the specific wall of the moulding 7. Thus, the axis of the injection gate 10 is parallel to the jointing plane. The longitudinal axis of the receiving chamber 8 extends generally perpendicularly to the jointing plane.

Figure 2:
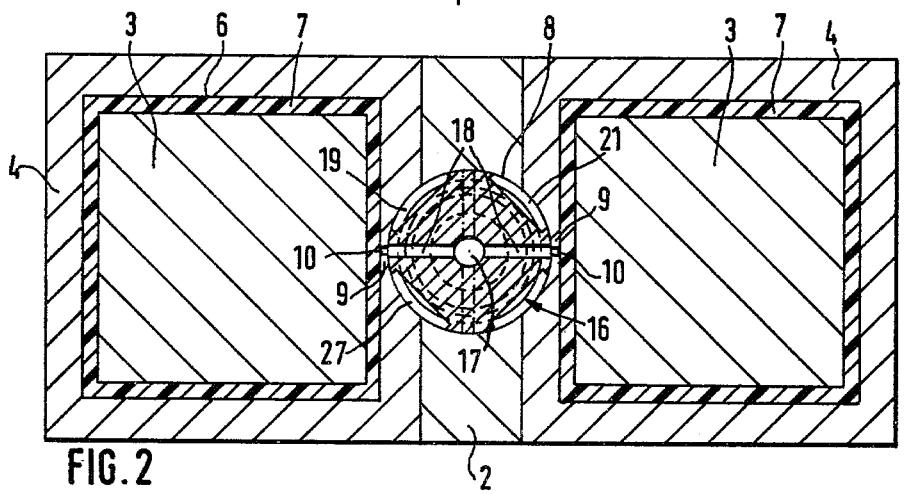
FIG. 2 is a section along line II—II in FIG. 1.

A heavy-duty sprue bush 11 is arranged within the receiving chamber 8. The heavy-duty sprue bush 11 is fastened by means of a supporting plate 12 to a mounting plate 13 for the mould platen 2. The heavy-duty sprue bush 11 comprises a cylindrical part 14 with a runner 15. On the front end of the cylindrical part 14 there is mounted an orifice head 16, which comprises a connecting duct 17 aligned with the runner 15 as well as sprue runners 18 extending perpendicularly therefrom. The sprue runners 18 are aligned with the injection gates 10. The ports of the sprue runners 18 tightly abut against the injection gates 10. Between the sprue runners 18, recesses 19 are provided on the periphery of the orifice head 16 so that air gaps remain free between the head and the wall of the receiving chamber 8. As shown in FIG. 2, it is also possible to provide more than two sprue runners 18 within the orifice head 16.

On the cylindrical part 14 and the likewise cylindrical front part 22 of the orifice head 16 there is wound a high watt density coiled heater which is drawn through one of the recesses 19. In the range of the front part 22 a sleeve 23 surrounds the high watt density coiled heater. Electrical connecting lines 24 for the 21 are led through a duct outwards and connected to a source of electrical energy. In the longitudinal direction of the cylinder portion 20 a duct 25 may be provided for the accommodation of a temperature sensitive element, or the like, in order to be able to exactly determine the temperature of the orifice head. For the heating of the foot portion of the heavy-duty sprue bush 11, a heater band 26 is provided.

FIGS. 1 and 2 show the heavy-duty sprue bush in the assembled condition in an injection moulding die. The receiving chamber 8 is arranged in the manner as described above within the mounting plate 13, the mould platen 2 and the mould insert 4. The heavy-duty sprue bush 11, with the high watt density coiled heater 21 wound on, is pushed into the receiving chamber 8. Opposite the die platens there remains free a gap 27 or 28, respectively, in the range of the cylinder portion 20 as well as in the front part 22 of the orifice head, so that the heat transfer from the hot heavy-duty sprue bush to the cooled die platens is as low as possible. The only contact occurs where the sprue runners 18 abut against the ports of the injection gates 10. The high watt density coiled heater 21 is firmly wound on the cylinder portion 20 as well as on the front part 22 and is secured on the front part 22 by the sleeve 23. Thus, it can be seen that a complete and efficient heating of the heavy-duty sprue bush is achieved over its whole length so that the thermoplast material remains plastic and free-flowing in the range of the runner 15, of the connecting duct 17, and of the sprue runners 18. Thus, the heavy-duty sprue bush always guarantees a clean and unobjectionable spruing operation. The thermoplast material is injected through the injection gates into the moulding chambers. In the separation of the die halves the sprue line situated within the injection gates 10 is smoothly sheared off so that the mouldings 7 comprise a clean sprue face. Sprue slugs cannot remain. After the moulding of the mouldings the die halves are moved together again in the usual manner. The material, which still is plastic within the heavy-duty sprue bush, is pressed out into the moulding chamber during the next working phase.

The embodiment of the invention according to FIGS. 1 and 2 shows the application of the invention during the immediate injection of the material into the moulding chambers.

Figure 3:
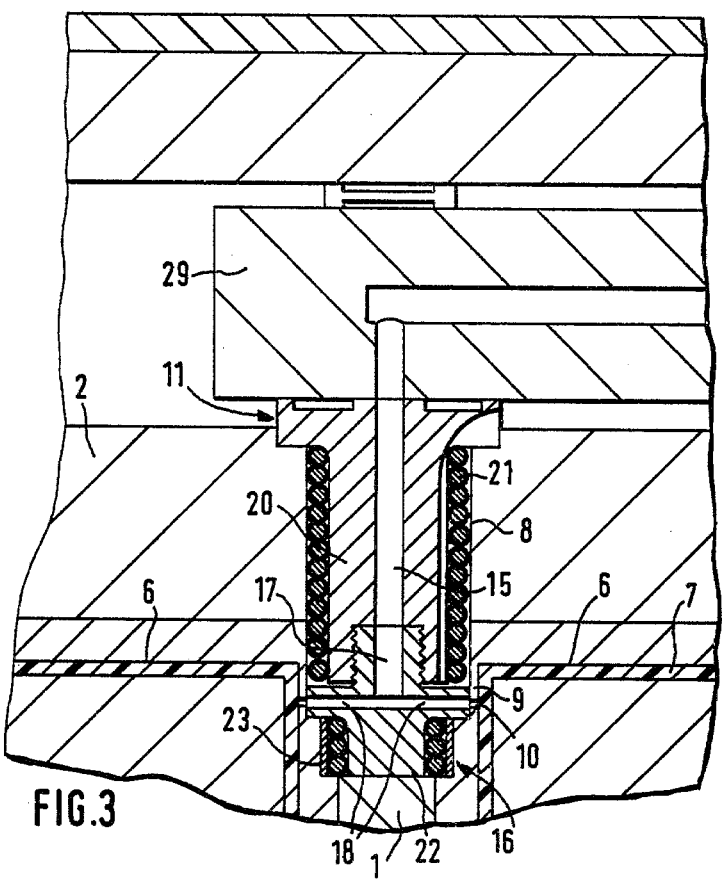
FIG. 3 is a section, corresponding to FIG. 1, through a modified embodiment of the invention.

FIG. 3 shows the application of the invention, using a distributor device, e.g., in the form of a heater beam 29. In this case, heater beam 29 is sequentially aligned with several heavy-duty sprue bushes 11, one of which is shown on the drawing.

We claim:

1. In an injection moulding die for moulding thermoplastic material, the die having a heavy-duty sprue bush of higher temperature than the die for a spruing through tunnel gating to at least one mould chamber, the heavy-duty sprue bush being: oriented generally perpendicularly to the jointing plane of the die; fixedly located within a receiving chamber in the die; and heated by a first electric heater portion coiled around it, the improvements comprising:

(a) an orifice head attached to a front end of the sprue bush and received in the receiving chamber, the orifice head having a generally cylindrical outer wall;

(b) means in the orifice head defining sprue runners, the axis of each runner extending generally parallel to, but displaced from the jointing plane of the die;

(c) a second electric heating coil portion wrapped around the generally cylindrical outer wall of the orifice head, the first and second heating coil portions serving to heat the sprue bush and the orifice head so as to maintain the moulding material in a plastic, free-flowing state throughout the length of the sprue bush and the sprue runners, the dimensions of the cylindrical outer wall and the second electric heating coil portion being such as to leave an insulating air gap between them and the receiving chamber to minimize heat transfer to the die; and, (d) means defining an injection opening through a side wall of each of the moulding chambers tightly abutting said sprue runners, the axis of each injection opening extending generally parallel to the jointing plane of the die, but displaced therefrom.

2. An injection moulding die according to claim 1 wherein the periphery of the orifice head has recesses between the sprue runners so as to define farther insulating air gaps between it and the receiving chamber thereby minimizing heat transfer to the die.

3. An injection moulding die according to claims 2 or 1, further comprising a sleeve surrounding the second electric heating coil portion in the vicinity of the orifice head.

4. An injection moulding die according to claims 2 or 1, further comprising means defining a duct in said sprue bush extending in the longitudinal direction to the front end of the sprue bush for a sensitive element, particularly a temperature sensitive element.

5. An injection moulding die according to claim 4, wherein the receiving chamber for the sprue bush and the moulding chamber define a very thin partition wall between them having a wall thickness of approximately 0.7 to 1.5 mm through which wall the injection opening extends.

6. An injection moulding die according to claim 4, further comprising sleeve surrounding the second electric heating coil portion in the vicinity of the orifice head.

7. An injection moulding die according to claims 2 or 1, wherein the receiving chamber for the sprue bush and the moulding chamber define a very thin partition wall between them having a wall thickness of approximately 0.7 to 1.5 mm through which wall the injection opening extends.

8. An injection moulding die according to claim 7, further comprising a sleeve surrounding the second electric heating coil portion in the vicinity of the orifice head.

* * * * *